(12) United States Patent
Gerwolls et al.

(10) Patent No.: US 8,998,298 B2
(45) Date of Patent: Apr. 7, 2015

(54) RECOVERABLE ENERGY ABSORBER

(75) Inventors: Matthew M. Gerwolls, Royal Oak, MI (US); Michael A. Rossi, Grosse Ile, MI (US); Dane Winbigler, Harper Woods, MI (US); Donald S Smith, Commerce, MI (US); Joel M. Cormier, Lathrup Village, MI (US); Richard F. Audi, Dearborn, MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 97 days.

(21) Appl. No.: 13/471,974

(22) Filed: May 15, 2012

(65) Prior Publication Data
US 2014/0027964 A1    Jan. 30, 2014

Related U.S. Application Data

(63) Continuation-in-part of application No. 12/729,480, filed on Mar. 23, 2010, now Pat. No. 8,465,087.

(60) Provisional application No. 61/164,700, filed on Mar. 30, 2009.

(51) Int. Cl.
*B60R 21/04* (2006.01)
*F16F 7/12* (2006.01)
*A42B 3/06* (2006.01)

(52) U.S. Cl.
CPC .......... *F16F 7/128* (2013.01); *B60R 2021/0442* (2013.01); *B60R 21/04* (2013.01); *A42B 3/065* (2013.01)

(58) Field of Classification Search
CPC .. B60R 21/04; B60R 21/0428; B60R 21/045; B60R 21/055; B60R 2021/04; B60R 2021/055; B60R 2021/0414; B60R 2021/0421; B60R 2021/0435; B60R 2021/0442

USPC .............. 296/187.05, 146.7, 214; 188/377; 206/521; 229/87.02; 428/132, 134, 428/137, 16, 174, 178; 217/52
See application file for complete search history.

(56) References Cited

U.S. PATENT DOCUMENTS 3,231,454 A    1/1966  Williams
3,828,715 A *  8/1974  Matsushita ................... 114/219
(Continued)

FOREIGN PATENT DOCUMENTS

JP         136582     10/1975
JP       9150692 A    11/1995
(Continued)

OTHER PUBLICATIONS

International Search Report and the Written Opinion, International application No. 2013/036703; date of mailing Jul. 19, 2013.
(Continued)

*Primary Examiner* — Dennis H Pedder
(74) *Attorney, Agent, or Firm* — Brooks Kushman P.C.

(57) ABSTRACT

An energy absorber includes a base sheet and a plurality of recovering crush lobes extending from the base sheet. The crush lobes protect an adjacent object by cushioning the blow following repeated impacts in both vehicular and non-vehicular (e.g. helmets) environments. Each crush lobe includes a side wall that is oriented to buckle or bend and then spring back after absorbing energy when impacted. At least one of the base sheet and an end wall of at least one crush lobe optionally includes a number (X) of integrally-formed protruding countermeasures where 0<=X<1000 of lower standing strength than the crush lobes. Methods related to the above are also described.

14 Claims, 5 Drawing Sheets

(56) References Cited

U.S. PATENT DOCUMENTS

| | | | |
|---|---|---|---|
| 5,744,763 A * | 4/1998 | Iwasa et al. | 181/286 |
| 6,017,084 A | 1/2000 | Carroll, III et al. | |
| 6,199,942 B1 | 3/2001 | Carroll, III et al. | |
| 6,221,292 B1 | 4/2001 | Carroll, III | |
| 6,247,745 B1 | 6/2001 | Carroll, III et al. | |
| 6,318,755 B1 * | 11/2001 | Nusser et al. | 280/752 |
| 6,679,967 B1 | 1/2004 | Carroll, III et al. | |
| 6,682,128 B2 | 1/2004 | Carroll, III et al. | |
| 6,752,450 B2 | 6/2004 | Carroll, III et al. | |
| 7,360,822 B2 | 4/2008 | Carroll, III et al. | |
| 7,377,577 B2 | 5/2008 | Cormier et al. | |
| 7,384,095 B2 | 6/2008 | Cormier et al. | |
| 7,404,593 B2 | 7/2008 | Cormier et al. | |
| 7,625,023 B2 * | 12/2009 | Audi et al. | 293/134 |
| 8,056,962 B2 * | 11/2011 | Tauchi et al. | 296/187.05 |
| 8,353,400 B2 * | 1/2013 | Santy et al. | 206/320 |
| 2006/0243636 A1 * | 11/2006 | Robichaud et al. | 206/586 |
| 2007/0228745 A1 | 10/2007 | Cormier et al. | |
| 2010/0244469 A1 | 9/2010 | Gerwolls et al. | |
| 2010/0326782 A1 | 12/2010 | Vandenberge et al. | |

FOREIGN PATENT DOCUMENTS

| | | |
|---|---|---|
| JP | 08085404 | 4/1996 |
| JP | 11348699 A | 12/1999 |
| KR | 20060065554 A | 6/2006 |
| WO | 0031434 | 6/2000 |

OTHER PUBLICATIONS

International Preliminary Report on Patentability; corresponding International application No. PCT/US2013/036703; date of issuance of report Nov. 18, 2014.

* cited by examiner

RECOVERABLE ENERGY ABSORBER

This application is a continuation-in-part of U.S. Ser. No. 12/729,480, filed Mar. 23, 2010, which claims benefit under 35 U.S.C. §119(e) from provisional application Ser. No. 61/164,700, filed Mar. 30, 2009, entitled ENERGY ABSORBER WITH ANTI-SQUEAK ANTI-RATTLE FEATURE, the entire contents of which applications are incorporated herein by reference.

BACKGROUND (1) Technical Field

The present invention relates to recoverable energy absorbers, such as are used non-destructively and re-usably for absorbing energy in automotive and non-automotive applications. It is to be understood that the present disclosure is not limited to automotive vehicles. Related technical fields could include head-protecting crash and sports helmets of various kinds.

(2) Background Art

Many different geometrically shaped thermoformed energy absorbers are known, such as those described in U.S. Pat. Nos. 6,017,084; 6,221,292; 6,199,942; 6,247,745; 6,679,967; 6,682,128; 6,752,450; 7,360,822; 7,377,577; 7,384,095; and 7,404,593. These absorbers are said to provide dynamic reactionary force characteristics that produce a relatively "square wave" shape when observing their reactionary force properties as a function of deflection.

Often, these formed energy absorbers lie between a Class-A surface which may take a hit (such as a bumper fascia, a headliner, or a door trim panel) and a rigid sheet metal structure (such as a vehicle frame or an engine block) in automotive applications. The energy absorber is typically designed with a 3-5 mm gap from one surface and is attached to another surface. However, in some instances it becomes necessary to increase the overall depth of the energy absorber so that the unattached surface is closer to the other surface during normal vehicle operation. Further, product variation may cause some areas to become closer than the optimal gap distance. When the energy absorber lightly contacts the opposing surface, due to relative movement between vehicle components, a buzz, rattle, or squeak can be heard, which customers object to or find annoying. This noise may occur because a flat hard plastic surface can tap or slide against the opposing structure.

Materials are sometimes added to or placed adjacent to energy absorbers in an effort to solve this problem. For example, in the past, a fabric pad, foam padding, or other kinds of flexible material have been added to one of the surfaces responsible for the noise in an effort to lessen or eliminate the severity of the buzzing or tapping, and/or to eliminate the possibility of one surface translating into the other (or translating across the other, causing a squeak). However, this requires the purchase and assembly of at least one separate component, causing added complexity, cost, and added mass.

SUMMARY OF THE PRESENT INVENTION

In one aspect of the present invention, an energy absorber includes a base sheet and a plurality of crush lobes extending from the base sheet. Each crush lobe includes a side wall that even when subjected to multiple hits deflects while absorbing energy and at least partially recovers after each hit. The crush lobe includes an end wall. At least one of the base sheet and the end wall of at least one crush lobe may include a number (X) of integrally-formed protruding countermeasures ("ears") where $0 <= X < 1000$. The protruding countermeasures have a lower standing strength than the crush lobes so that the protruding countermeasures dampen movement that may otherwise cause buzzes, squeaks and/or rattles ("BSR") between the end wall and an adjacent structure.

An object is to provide an energy absorber with recoverable crush lobes that are re-usable so that reinstallation of the energy absorber after a hit (e.g., a helmet worn in a football or hockey game) is not required for comfort or safety.

Preferably the energy absorber does not add appreciably to the weight of a final assembly of for example, a helmet or a door trim/energy absorber/headliner assembly.

Another object is to provide a BSR countermeasure that does not significantly affect the energy absorbing characteristics of the absorber itself.

In another aspect of the invention, an energy absorber includes a base sheet and a plurality of frusto-conical crush lobes extending from the base sheet. Each crush lobe has a side wall that is oriented so that upon receiving the forces of impact ("incident forces"), the side wall offers some resistance, deflects and reverts (springs back) to a compression set point or to the un-deflected pre-impact initial configuration while exerting reactionary forces to oppose the incident forces. This phenomenon effectively cushions the blow by arresting the transmission of incident forces towards the mass or object to be protected (e.g., an anatomical member, a piece of sheet metal, an engine block, or the head of a passenger or player).

The side wall(s) while deflecting (e.g., by columnar buckling) absorb energy when impacted. If present to reduce "BSR", a crush lobe may have an end wall with an integrally-formed countermeasure of lower standing strength than the crush lobe. In some applications, the countermeasure extends in a direction away from or opposite to the impacting force and is oriented so that it dampens movement that would otherwise cause BSR between the energy absorber and an adjacent mass or structure.

In another aspect of the present invention, a method includes the substantially simultaneous steps of forming an energy absorber with a base sheet and recoverable, re-usable crush lobes extending from the base sheet with associated integral countermeasures of a weaker standing strength than the crush lobes.

In another aspect of the present invention, a method includes steps of (1) providing a component or other mass to be protected, (2) forming, substantially simultaneously an energy absorber including recoverable, re-usable crush lobes and optionally at least one countermeasure in an end of one of the crush lobes, the countermeasure being configured to interface with the component or mass when placed adjacently, so that BSR from movement of the energy absorber relative to the adjacent component or mass is eliminated, and (3) assembling the energy absorber and the component or mass in adjacent positions.

In still another aspect of the present invention, a thermoforming apparatus for making the energy absorber includes a heater for heating a flat sheet of polymeric material, at least one thermoforming die for forming the flat sheet into a three-dimensional energy absorber that repeatably absorbs impacting forces non-destructively, the absorber having a base sheet and a plurality of crush lobes, and tooling for forming an optional BSR countermeasure in at least one of the base sheet and the crush lobes.

These and other aspects, objects, and features of the present invention will be understood and appreciated by those

BRIEF DESCRIPTION OF DRAWINGS

FIGS. 4-6 and FIGS. 7-9 are cross-sectional views of modified energy absorbers. FIGS. 4-6 and FIGS. 7-9 are similar to FIGS. 1-3, respectively, but having the BSR countermeasures formed on a top end or end wall of the crush lobes;

FIGS. 10-12 are cross-sectional views of a thermoformed energy absorber with crush lobe(s). FIG. 10 shows the energy absorber as initially thermoformed and for some applications is ready for deployment;

DETAILED DESCRIPTION OF PREFERRED EMBODIMENTS

In several embodiments of the invention the disclosed energy absorber has a base sheet and a plurality of crush lobes that are reusable after exposure to multiple impacts. The crush lobes extend from the base sheet. Each crush lobe has an end wall and a side wall that reverts at least partially towards an un-deflected configuration within a time (T) after impact, thereby absorbing energy non-destructively after being impacted. Optionally, the end wall of at least one crush lobe in the plurality of crush lobes including a number (X) of integrally-formed countermeasures, where 0<=X<1000.

In some cases, the crush lobe reverts to an un-deflected or compression-set configuration after a first impact. In other cases, the crush lobe reverts to the compression-set configuration after multiple impacts.

To absorb impact forces, the side wall of a crush lobe bends in response to impact and springs back to an un-deflected configuration in further response to impacting forces. In some cases opposing side walls of a crush lobe bend at least partially convexly after impact. In other cases, opposing side walls of a crush lobe bend at least partially concavely after impact. Sometimes, opposing side walls of a crush lobe bend at least partially concavely and convexly after impact.

In one embodiment, the energy absorber has a crush lobe with an end wall that includes an embossed ring in a support area around the countermeasure. If present, the domed end wall is supported by an upper periphery of the side wall and deflects inwardly, thereby absorbing a portion of the energy dissipated during impact.

Several alternative designs call for the countermeasure to be formed in the base sheet. In others, the countermeasure is formed in the end wall of a crush lobe.

Optionally, the end wall includes a support section for supporting the countermeasure. In such cases, the countermeasure is formed from material taken from the support section and flowed into a shape of the countermeasure while the energy absorber material is formed.

Aided by these structures, the disclosed energy absorber can be re-used after single or multiple impacts. For example the hockey or football player need not change his helmet after every blow. This is because the side walls revert toward an un-deflected configuration within a time (T) after the associated crush lobe is impacted. Usually 0<T<about 90 seconds. Most of the recovery occurs quite soon after impact. The remainder of the recovery occurs relatively late in the time period of recovery.

In a given end wall there is a number (X) of countermeasures, where 0<=X<1000.

As to the shape of the lobes, it is useful to define a perimeter at the intersection of the side wall and the base sheet. The perimeter is of a shape selected from the group consisting of a circle, an oval, an ellipse and a polygon.

Preferably, one or more of the countermeasures has an elongated member with a substantially uniform cross section along its length.

Thus it will be understood that at least some of the crush lobes revert to or towards a pre-impact or compression-set configuration after one or more within a time (T) that is less than about 90 seconds.

As illustrated by the several variations shown in the attached figures and in the discussion below, it is contemplated that an optional "soft" BSR countermeasure structure can be formed integrally, or trimmed into, or attached to the existing material of a recoverable, re-usable energy absorber at or near the location(s) of potential buzz, squeak, or rattle BSR noises.

Where deployed, the BSR countermeasure has a relatively lower longitudinal/standing strength than the crush lobe it is associated with. Accordingly, it acts as a dampener, thus greatly reducing the likelihood of significant BSR noises in the final assembled product (such as an automotive vehicle or crash helmet for a motor cyclist or a helmet for the skier, hockey player or football player). Further, a significant assembly cost reduction and mass reduction can be realized with only a minimal or zero increase in the tooling and/or manufacturing cost because various wadding or muffling materials are no longer needed.

Various headliner constructions are illustrated in the drawings. However, persons skilled in this art will understand that the present disclosure is not limited to headliners, but instead can be applied to many other applications, including but not limited to other locations in a vehicle (e.g., doors, instrument panels, trim components for A, B and C pillars and roof supporting structures of vehicles, and other components), various types of protective headgear, and other protective gear that intercedes between an anatomical member (e.g., a knee, elbow, stomach) and an impacting object.

In one embodiment, an energy absorber 10 (illustrated in FIGS. 1-3) includes a matrix of hollow frusto-conical, distended frusto-conical (e.g. with an oval or elliptical footprint/lower perimeter/upper perimeter or cross section), cup-shaped (with a wall that is curvilinear—e.g., bowed, convex or concave when viewed from the side—or flat), domed, hemi-spherical or flat-sided pyramid-shaped) three-dimensional crush lobes 11 extending from a base sheet 12. At least some of the crush lobes 11 have an optional BSR countermeasure 15 that extends from an end wall 16 of a crush lobe 11. In some cases the countermeasure 15 may effectively be flattened somewhat so that it resembles a domed end wall 16 that extends between the sidewalls of a crush lobe 11.

Figure 1:
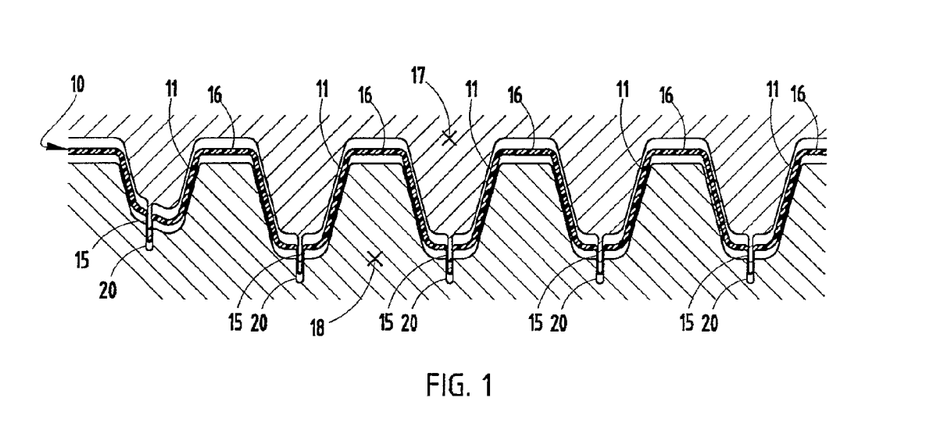
FIG. 1 is a cross-sectional view of opposing thermoforming dies for forming a sheet into a energy absorber with a plurality of protruding crush lobes. At least some of the lobes have an integral optional countermeasure for reducing buzzes, squeaks, and rattles (BSR) upon installation.
Figures 2, 3:
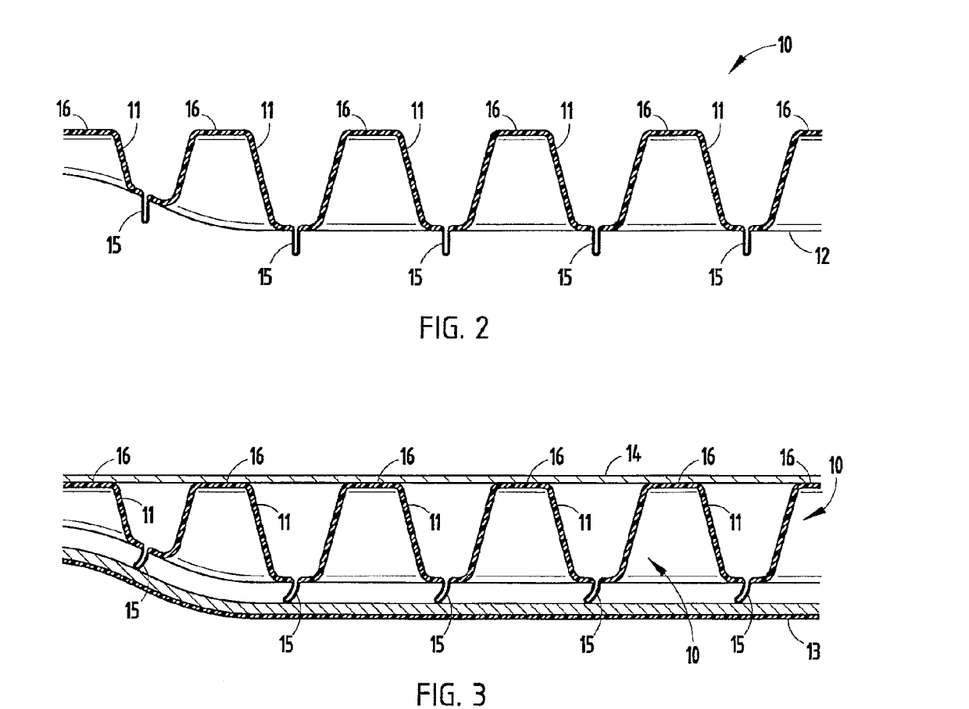
FIG. 2 is a cross-sectional view showing the thermoformed energy absorber of FIG. 1.
FIG. 3 is a cross-sectional view showing the energy absorber installed between for example a roof structure of a passenger vehicle and a headliner or a helmet and the head of a wearer.

The crush lobes 11 can be arranged on the energy absorber 10 in any repeating or non-repeating, uniform or non-uniform pattern desired, such as an orthogonal or diagonal matrix of rows (parallel or converging) and columns (parallel or converging) that would partially or totally cover the mass to be protected, for example an area of a vehicle roof from the side-to-side and from the front-to-rear of a vehicle's passenger compartment.

Further, the crush lobes 11 can be similar to each other or can be varied, so as to have different or similar footprints, widths, heights, and/or cross-sectional shapes (parallel or perpendicular to the base sheet). The crush lobes 11 can have uniform or non-uniform spacing and/or different lateral relationships and/or be varied to accommodate the spatial constraints imposed by the environment of use, such as the vehicle roof and mating structures as needed for energy absorption in different areas of the assembly. For example, the energy absorber 10 can have different regions, some regions having crush lobes arranged or configured a first way, and other regions having crush lobes arranged or configured a second or different way. This is often the situation where energy absorbers are used in for example vehicle roof structures, as will be understood by persons skilled in this art. After thermoforming, the base sheet may be flat or bent as desired.

As one example, the illustrated energy absorber 10 is thermoformed from a heated sheet of polymeric material by opposing forming dies 17, 18 (see FIG. 1), and then cooled to form a three-dimensional functional component (see FIG. 2). Opposing forming dies 17, 18 are illustrated, but it is contemplated that the present inventive concepts can be mad using other forming processes, such as a thermoforming process using only a single sided die (e.g. by vacuum thermoforming). Also, the present inventive concepts can be made by other forming processes, such as injection molding, compression molding, and the like.

Once formed, the illustrated energy absorber 10 is adapted to fit between and generally bridge a gap between for instance a vehicle headliner 13 and its roof 14 (see FIG. 3). In the exemplary application depicted, the crush lobes 11 and the base sheet 12 are generally configured to occupy at least some space between the headliner 13 and roof 14. The outer ends 16 (also called "end walls" herein) of the crush lobes 11 and the base sheet 12 generally match the contoured mating surfaces on the headliner 13 and roof 14.

The illustrated energy absorber 10 has differently shaped crush lobes 11 that are configured to meet aesthetic requirements and cover protruding bolts plus other fittings while optimizing the safe absorption of energy and distribution of impact loads in order to reduce at least in vehicular applications passenger head injury (such as during a vehicle crash or roll-over accident) or in other non-vehicular applications (such as head- or limb-protecting gear).

As noted above, the illustrated energy absorber 10 further optionally includes a buzz, squeak, rattle (BSR) countermeasure 15 (also called an "ear" or "soft structure" herein) integrally formed into its base sheet 12 or into one or more outer ends 16 of the crush lobes 11, as illustrated. An energy absorber 10 may have crush lobes 11 with a collective number (X) of ears 15 that are associated with the energy absorber 10, where 0<=X<1000. A given crush lobe 11 may have none or multiple countermeasures 15.

The countermeasures 15 have a lower standing strength than the crush lobes 11. Their "softness" acts to reduce the potential for BSR noises caused by repeated noise-generating vibration and/or cyclical movement of the energy absorber 10 against adjacent rigid surfaces on for example the headliner 13 and roof 14.

Vehicle manufacturers spend considerable time and effort to eliminate BSR noises because they can be very irritating and annoying to vehicle drivers and passengers, particularly when the BSR noises come from a location close to a passenger's head, and/or any component in the vehicle's passenger compartment, especially when the noises are created near or are amplified by components that effectively form an echo chamber.

If present in the base 12 or end wall 16, the illustrated BSR countermeasure 15 (FIG. 1) is formed by pins 20 that protrude from the top die 17 into a mating recess in the lower die 18. The pins 20 include a frustoconically-shaped shaft of decreasing diameter and a rounded tip so that they do not pierce the sheet, but instead stretch the sheet material to form an ear or finger-like thin-walled hollow elongated BSR countermeasure 15. For example, the countermeasures 15 can define a very narrow hollow finger. Its size, shape, and length are basically about the same as a thumbtack shaft protruding from a surface.

In some cases the floor (or roof, depending on orientation) 16 of a crush lobe 11 itself may be domed to form a countermeasure 15 so as effectively to interface with a neighboring structure, thereby reducing an area of contact there between and reducing or eliminating BSR.

The illustrated BSR countermeasures 15 are sufficient in length and strength to maintain their general elongated shape after the material of base sheet 12 is cooled (see FIG. 2). But the BSR countermeasures 15 have relatively low beam strengths such that they are easily bent over when engaged (see FIG. 3). In particular, the length of the BSR countermeasures 15 in combination with crush lobes 11 is greater than any expected gap between the headliner 13 and the roof 14 (in vehicular applications), such that the BSR countermeasure 15 contacts the headliner 13 (or roof 14) and is bent over during assembly into the vehicle.

The BSR countermeasure 11 also compensates for variation in the gap size due to part tolerance variation, assembly stack-up variations, and other process and part variables leading to inconsistent gaps. This results in the BSR countermeasures 15 acting to dampen any cyclical or vibratory movement of the energy absorber 10, which in turn eliminates most BSR noises.

As an example, it is contemplated that the BSR countermeasures 15 can be about ⅛ to ½ inch long (or more typically about ¼ to ⅜ inch long), and at their base about 1/32 to ¼ inch in diameter (or more preferably about 1/16 to ⅛ inch in diameter).

The following additional embodiments, features, and characteristics are identified by using the same reference numerals but with an additional letter "A", "B", "C", etc.

Figure 4:
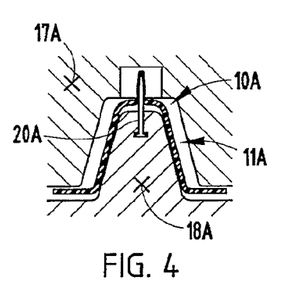
Figure 4A:
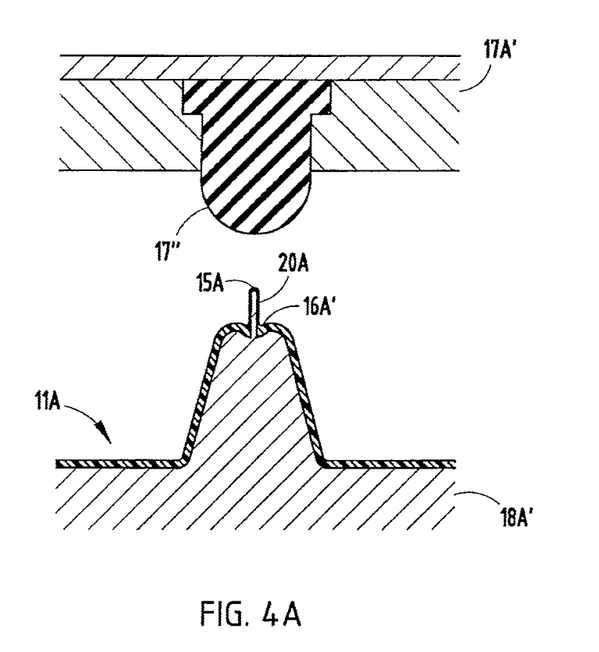
Figure 5:
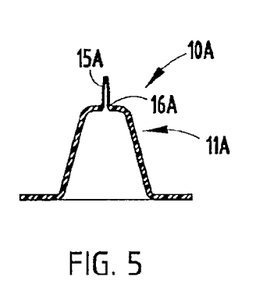
Figure 6:
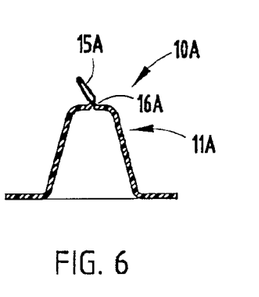
Figure 7:
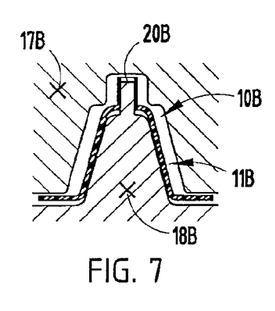
Figure 8:
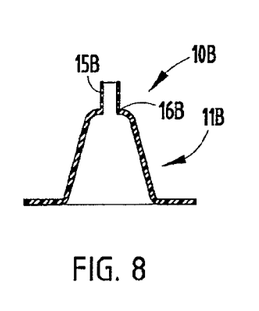
Figure 9:
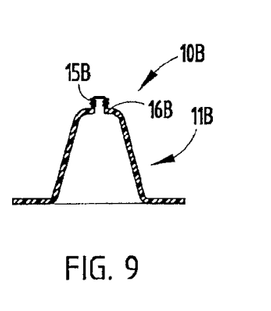

The energy absorber 10A (FIGS. 4-6) is similar to energy absorber 10 (FIGS. 1-3), except that in the crush lobe 11A of energy absorber 10A (FIGS. 4-6), the BSR countermeasure 15A is formed in an outer flat tip or end wall of the crush lobe 11A. In energy absorber 10 the BSR countermeasure 15 is formed in the base sheet 12 (FIG. 2) by dies 17A and 18A. The energy absorber 10B (FIGS. 7-9) is similar to energy absorber 10A since its BSR countermeasures 15B are formed on outer ends of the crush lobes 11B. However, the BSR countermeasures 15B are sleeve-like and have a uniform diameter along their length and an open (or very thin) outer end. Due to a thinness of the sleeve-like BSR countermeasures 15B, they have a relatively low columnar strength and low bending strength, causing them to fold in an accordion-like manner or to distort in a lateral direction. Nonetheless, their strength is sufficient to provide dampening similar to BSR countermeasures 15 and 15A.

A particular energy absorber 10 can include crush lobes 11 with a variety of different shapes/sizes/locations of the BSR countermeasures. In some cases the roof or floor (depending on orientation) alone of a crush lobe 11 may effectively serve as the countermeasure 15. For example, a particular energy absorber could have one or more of each of the BSR countermeasures 15, 15A, or 15B (or any of the following BSR countermeasures). In other words, not every single crush lobe 11 may be provided with or require a BSR countermeasure 15.

Figure 10:
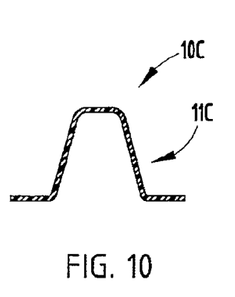
Figure 11:
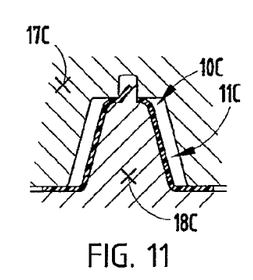
FIG. 11 depicts a secondary punch (or downstream-positioned punch tool in a thermoform line)
Figure 12:
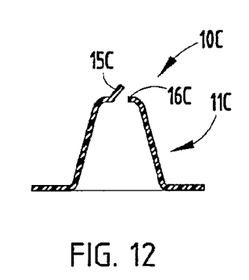
FIG. 12 showing the energy absorber of FIG. 10 but includes the integral BSR countermeasure.
Figure 13:
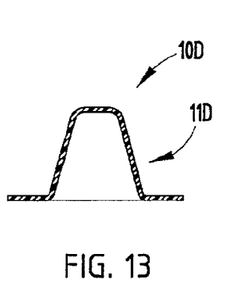
FIGS. 13-15 are cross-sectional views of a modified energy absorber similar to FIGS. 10-12, but with an alternatively-shaped BSR countermeasure.
Figure 14:
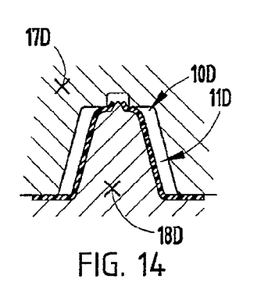
Figure 15:
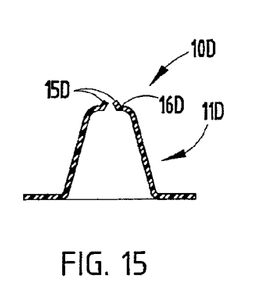

FIGS. 10-25 illustrate additional embodiments of interest. A section of the energy absorber 10 that comes into contact with the mating component is cleaved and then pushed up (or down) to create a flexible member whose surface area is relatively small and has a low bending strength. For example, this can be done during molding or in secondary tooling at a location after the energy absorber 10 with crush lobes 11 is formed. In crush lobe 11C (FIGS. 10-12), the BSR countermeasure 15C is formed by a section of material cleaved by tooling 17C and 18C on one side from end 16C such that the BSR countermeasure 15C extends at an angle to the end 16C. The BSR countermeasure 15C has a similar thickness to the end 16C. The crush lobe 11D (FIGS. 13-15) is similar to crush lobe 11C, except BSR countermeasure 15D is formed by a section of material cleaved so that the BSR countermeasure 15D extends from both sides of end 16D toward a common (center) point in the end 16D. Notably, one embodiment of the BSR countermeasure 15D can include two opposing finger-like outwardly-angled tabs, or can include multiple finger-like tabs extending inwardly to form a ring, or can form a soft dome-like protruding ring (FIG. 15) or a closed annulus in an end 16D.

Figure 16:
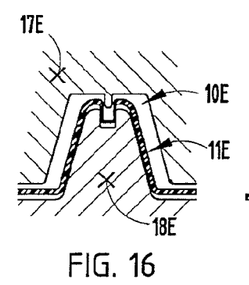
FIGS. 16-19 illustrate crush lobes similar to FIGS. 14-15, respectively, but with alternatively-shaped BSR countermeasures.
Figure 17:
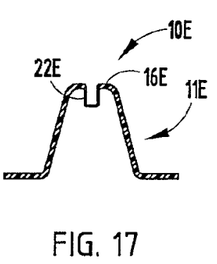
Figure 18:
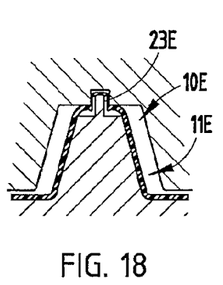
Figure 19:
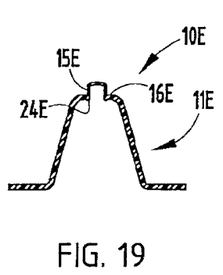

One embodiment of the crush lobe 11E (depicted in FIGS. 16-19) includes an inverted well, cylinder or cone 22E formed in the outer end (floor or ceiling) 16E and that extends into a cavity of the crush lobe 11E (FIGS. 16-17). In a secondary step (FIG. 18), secondary tooling such as a punch 23E extends upward from within the crush lobe 11E through the cone 22E to form a BSR countermeasure 15E that extends above an end 16E of the crush lobe 11E. By this arrangement, the area 24E of end 16E around the BSR countermeasure 15E is embossed lightly to form a depressed or embossed ring, which affects its columnar strength. Restated, by forming a cone 22E (i.e., a female feature) and then reversing it either mechanically or pneumatically (i.e., using the punch 23E), a soft top feature (i.e., BSR countermeasure 15E) can be achieved that is more compliant than a traditional surface. More generally stated, crush lobe 11E illustrates that a strength of the BSR countermeasure 15E can be affected by a shape and forming process of the supportive area around the BSR countermeasure 15E, as well as by the shape and forming process of the BSR countermeasure itself.

Figure 20:
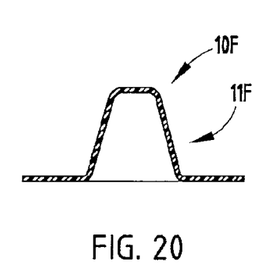
FIGS. 20-22, 23-25, 26-28, and 29-30 are cross-sectional views of modified energy absorbers similar to FIGS. 10-12, respectively, but with alternatively-shaped BSR countermeasures.
Figure 21:
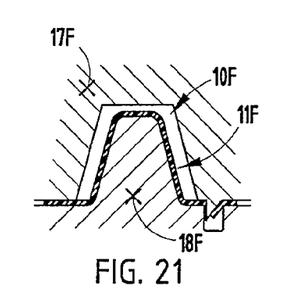
Figure 22:
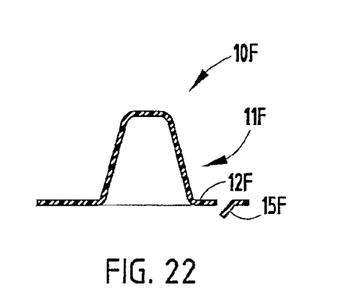
Figure 23:
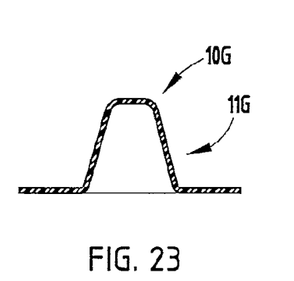
Figure 24:
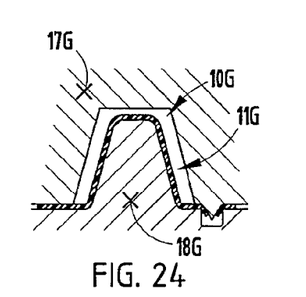
Figure 25:
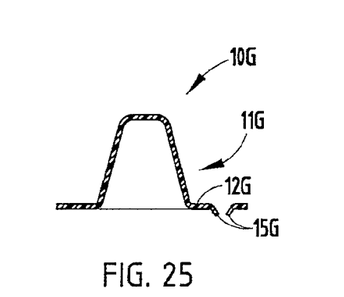

The crush lobes 11F (FIGS. 20-22) and crush lobes 11G (FIGS. 23-25) illustrate BSR countermeasures 15F and 15G, respectively, that are similar to the BSR countermeasures 15C and 15D, but that are located in the base sheet 12F and 12G, respectively (instead of on the end, roof or floor of the crush lobes). Notably, the BSR countermeasures 15F and 15G have a thickness similar to the base sheets 15F and 15G, such that their bending strength is potentially greater than those of BSR countermeasures 15C and 15D. It is contemplated that a BSR countermeasure could also be located in a side of a crush lobe, though typically that is not an area resulting in BSR noise.

Figure 26:
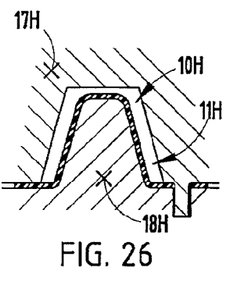
Figure 27:
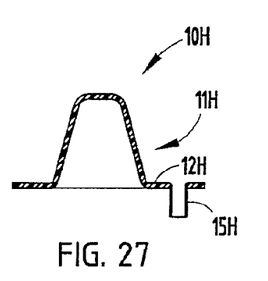
Figure 28:
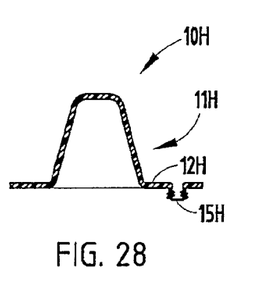

The crush lobe 11H (FIGS. 26-28) has a BSR countermeasure 15H that is similar to the BSR countermeasure 15B in crush lobe 11B (FIGS. 7-9) in that it is sleeve-like or columnar in shape, except in crush lobe 11H, the BSR countermeasure 15H is formed from the base sheet 12H and extends in a direction opposite the crush lobe 11H.

Crush lobe 11I (FIGS. 29-30) includes a BSR countermeasure 15I comprising a thin solid finger of material. The illustrated BSR countermeasure 15I is thinner than the base material (see base sheet 12I) of the initial sheet of plastic prior to thermoforming. The illustrated "solid finger" (i.e., BSR countermeasure 15I) is tapered and angled, but it is contemplated that it can be made to be straight walled or tapered along its length, and also it can extend perpendicularly or angled in direction. By selecting a desired shape and direction, one can provide an appropriate degree of flexibility to create a "soft" structure that minimizes BSR noises of assemblies.

The illustrated tooling dies 17I and 18I (FIG. 29) include opposing coining die parts. Specifically, the coining die parts include a sleeve 30I configured to capture a slug of plastic material on a top of the protruding portion of tool 18I. A plunger 32I extends through the sleeve 30I and includes a cavity-defining area in its tip in the shape of the BSR countermeasure 15I. The plunger 32I can be extended via pneumatic or other means, and can be retracted by similar means or by a return spring (not specifically shown). When tools 17I and 18I are moved together, the sleeve 30I captures a slug of heated material in the original polymeric sheet as the energy absorber 10I is being formed. Once engaged, the plunger 32I extends within the sleeve 30I to flow (i.e., "coin") the captured material into the cavity defined in the end of the plunger 32I. This process is sometimes called "coining". Thus, the BSR countermeasure 15I accurately takes on a shape of the cavity area, which is illustrated as being an elongated triangular shaped finger.

Figure 29:
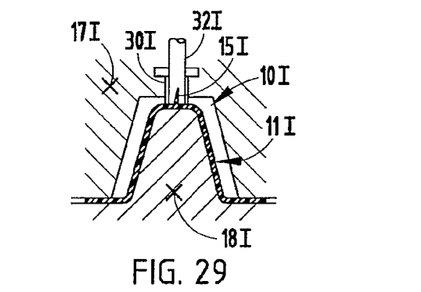
Figure 30:
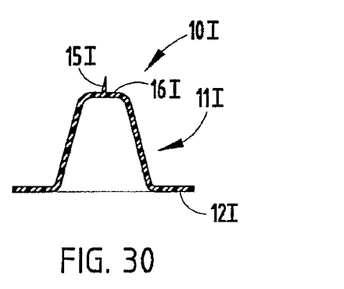

Notably, the countermeasure 15I is not limited to only the thickness of the end 16I (nor limited to a thickness of the base sheet 12I, depending on where the BSR countermeasure is located). Nor is the BSR countermeasure limited to any final volumetric or dimensional constraints. Instead, a shape and thickness of the BSR countermeasure 15I is only limited by a volume of the material making it up, which must be taken from areas surrounding the BSR countermeasure 15I. Further, it is noted that a ring around the countermeasure 15I (i.e. the region where material is taken from to form the countermeasure 15I) is thinned, thus resulting in softening or reducing an axial and torsional strength of the BSR countermeasure 15I.

Notably, the present invention includes methods and apparatus related to forming the countermeasures 15 into an energy absorber 10, including forming the countermeasures 15 after the part is thermoformed (such as at an end of the thermoforming line) and/or forming the countermeasure(s) during or after assembly of the energy absorber to a vehicle, and/or forming the countermeasure(s) 15 in the field such as for a field/service fix based on a consumer complaint.

Figure 31:
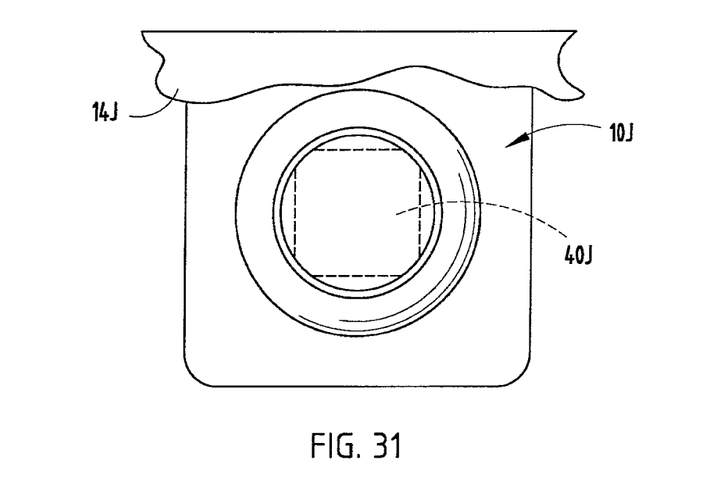
FIGS. 31 and 32 are top plan and cross-sectional views of an alternative modified energy absorber with another alternative BSR countermeasure, the countermeasure including a magnet.
Figure 32:
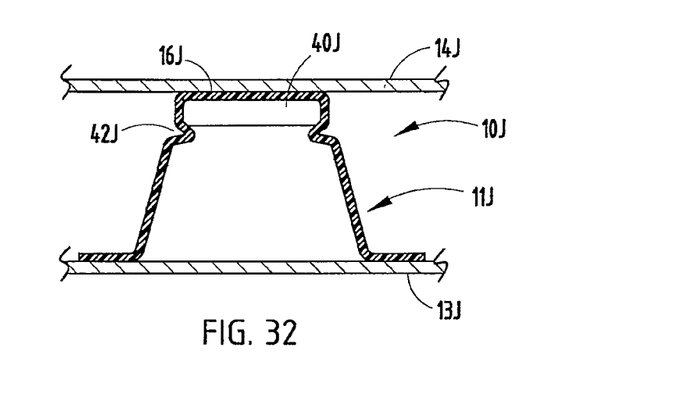

FIGS. 31-32 disclose another energy absorber 10J with a crush lobe 11J where a magnet 40J is positioned in an end 16J of the crush lobe 11J. The magnet 40J is sufficiently strong to provide magnetic attraction through the end wall 16J of the crush lobe 11J. Thus, the magnet 40J serves to magnetically attach to adjacent sheet metal, such as roof structure 14J. This arrangement can be used as an attachment for retaining a part in position, as well as an attachment for retaining a flexible center portion of a part against adjacent sheet metal, while other retainers are used on the part in other locations.

Also, the present arrangement can be used to eliminate noise, such as when the sheet metal is close enough to vibrate against the crush lobe 11 to cause BSR noise, thus causing magnetic attraction that eliminates any movement and hence eliminates the noise. The illustrated magnet 40J is held in an end of the crush lobe by deformation of an end of the crush lobe sufficiently to cause a retaining ridge 42J to form around the magnet, thus holding the magnet between the retaining ridge 42J and the end 16J of the crush lobe. The retaining ridge can be formed in different manners. It is contemplated that the magnet can be pressed into the end with sufficient force to temporarily deform the sidewalls of the crush lobe adjacent the end wall, thus essentially forming a retaining ridge by temporarily stretching the material of the side wall. Also, by positioning a magnet within the crush lobe while the material of the crush lobe is still relatively warm (or hot), the material will shrink onto the magnet, thus frictionally holding the magnet in place and also integrally forming the retaining ridge. If desired, the crush lobe can be deformed downwardly to deform the crush lobe into a shape including the ridge. It is also contemplated that the magnet can be friction fitted into the crush lobe, such that the ridge is very small or essentially non-existent.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An energy absorber comprising:
a planar base sheet and
a plurality of crush lobes that are reusable, the crush lobes extending from the base sheet, each crush lobe including an end wall and a side wall that reverts at least partially towards an un-deflected configuration after impact, thereby absorbing energy non-destructively after being impacted,
the end wall of at least one crush lobe in the plurality of crush lobes including a number (X) of integrally-formed hollow countermeasures for dampening movement that may otherwise cause buzzes, squeaks and/or rattles between the end wall and an adjacent structure, where $1<=X<1000$, the end wall also including an embossed ring in a support area for supporting the countermeasures, and wherein the countermeasure includes material from the support area and assumes a shape of the countermeasure.

2. The energy absorber defined in claim 1, wherein one or more of the countermeasures is a domed end wall.

3. The energy absorber defined in claim 1, wherein the at least one crush lobe reverts to a pre-impact configuration after a first impact.

4. The energy absorber defined in claim 3, wherein the at least one crush lobe reverts to the pre-impact configuration after multiple impacts.

5. The energy absorber defined in claim 1, wherein the at least one crush lobe reverts towards a pre-impact configuration after a first impact.

6. The energy absorber defined in claim 3, wherein the at least one crush lobe reverts towards the pre-impact configuration after multiple impacts.

7. The energy absorber defined in claim 1, wherein the side wall bends in response to impact and springs back to an un-deflected configuration in further response to impacting forces.

8. An energy absorber comprising:
a planar base sheet and
a plurality of crush lobes that are reusable, the crush lobes extending from the base sheet, each crush lobe including an end wall and a side wall that reverts at least partially towards an un-deflected configuration after impact, thereby absorbing energy non-destructively after being impacted,
the end wall of at least one crush lobe in the plurality of crush lobes including a number (X) of integrally-formed hollow countermeasures for dampening movement that may otherwise cause buzzes, squeaks and/or rattles between the end wall and an adjacent structure, where $1<=X<1000$, wherein the end wall includes an embossed ring in a support area around the countermeasure.

9. The energy absorber defined in claim 2, wherein the domed end wall is supported by an upper periphery of the side wall and deflects inwardly, thereby absorbing a portion of the energy dissipated during impact.

10. An energy absorber comprising:
a planar base sheet;
a plurality of re-usable crush lobes extending from the base sheet, at least some of the crush lobes including
a side wall that absorbs energy by partial deformation and reverting toward an un-deflected configuration after the associated crush lobe is impacted; and
an end wall including a number (X) of hollow countermeasures for dampening movement that may otherwise cause buzzes, squeaks and/or rattles between the end wall and an adjacent structure, where $1<=X<1000$, the end wall also including an embossed ring in a support area for supporting the countermeasures, and wherein the countermeasure includes material from the support area and assumes a shape of the countermeasure.

11. The energy absorber defined in claim 10, wherein the side wall reverts to a pre-impact position after an impact.

12. The energy absorber defined in claim 10, wherein the crush lobes have a perimeter at the intersection of the side wall and the base sheet.

13. The energy absorber defined in claim 12, wherein the perimeter is of a shape selected from the group consisting of a circle, an oval, an ellipse and a polygon.

14. The energy absorber defined in claim 10, wherein one or more of the countermeasures comprise an elongated member having a substantially uniform cross section along its length.

* * * * *